G. WALTHER.
WHEEL.
APPLICATION FILED AUG. 23, 1918.
1,304,130.
Patented May 20, 1919.
2 SHEETS—SHEET 2.
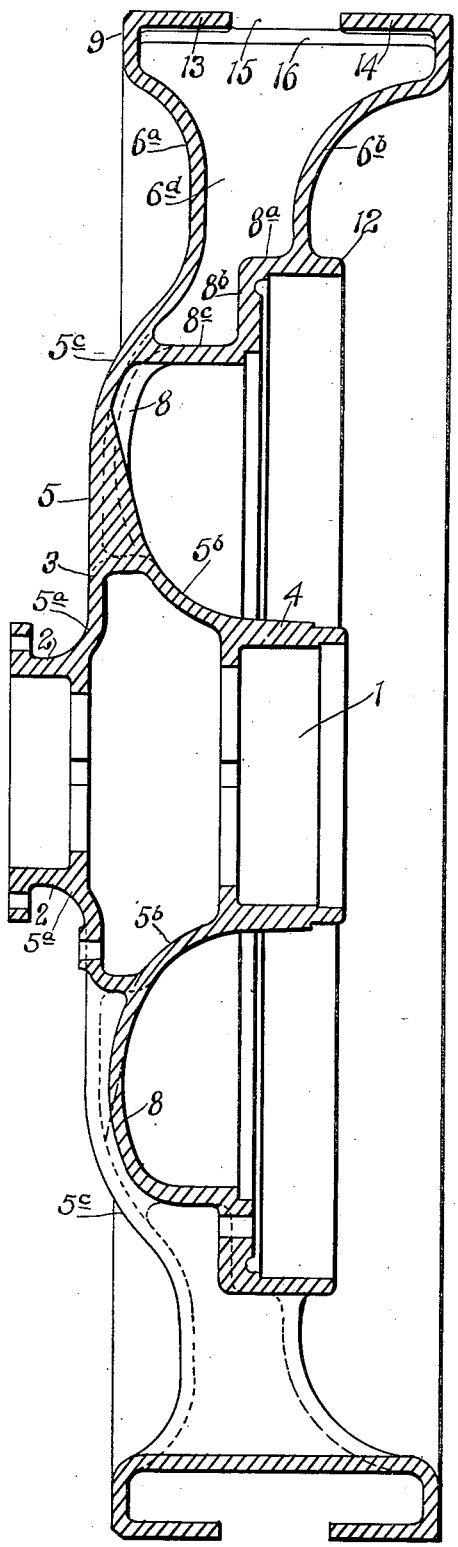
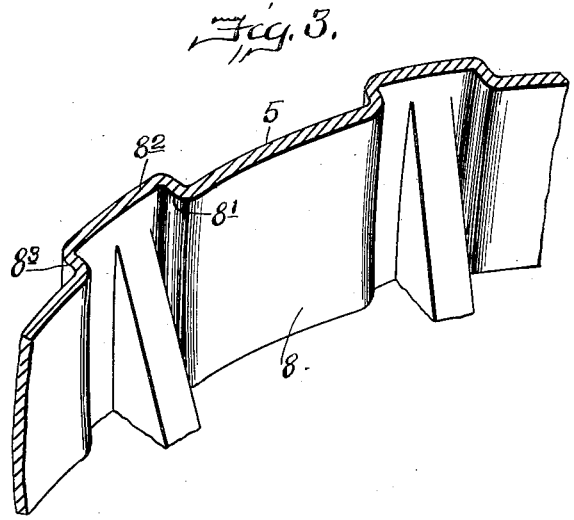
Inventor
George Walther,
By Toulmin, Toulmin + Glass,
Attorneys

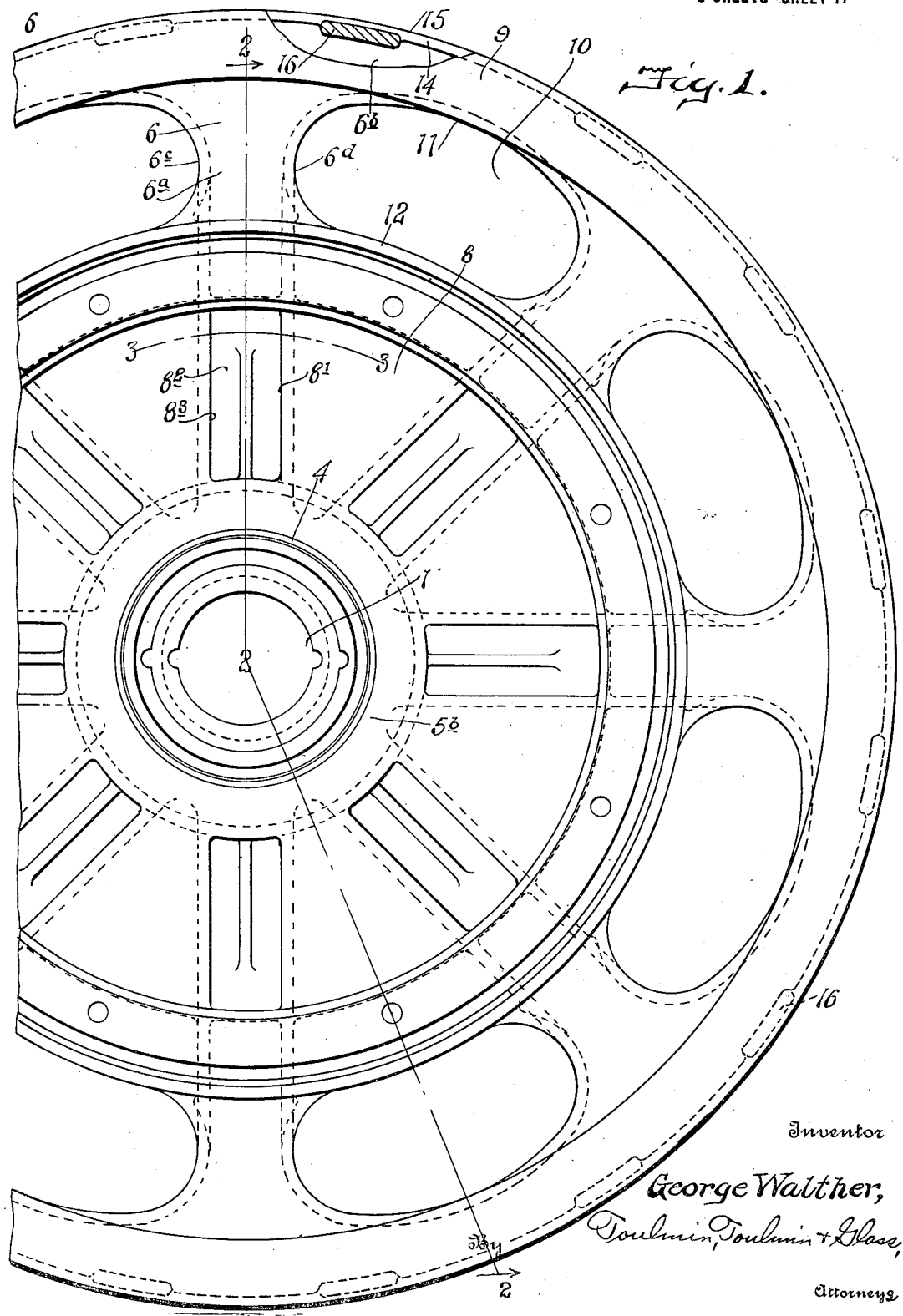

UNITED STATES PATENT OFFICE.

GEORGE WALTHER, OF DAYTON, OHIO, ASSIGNOR TO THE DAYTON STEEL FOUNDRY COMPANY, OF DAYTON, OHIO, A CORPORATION OF OHIO.

WHEEL.

1,304,130.

Specification of Letters Patent. Patented May 20, 1919.

Application filed August 23, 1918. Serial No. 251,088.

*To all whom it may concern:*

Be it known that I, GEORGE WALTHER, a citizen of the United States, residing at Dayton, in the county of Montgomery and State of Ohio, have invented certain new and useful Improvements in Wheels, of which the following is a specification, reference being had therein to the accompanying drawing.

This invention relates to wheels, particularly steel wheels of the type known as "four wheel drive", where each of the four wheels of the truck is a driving wheel.

One of my objects is to provide a steel wheel of hollow construction throughout, hub, spokes and rim, which will afford the maximum of strength and sufficient resiliency. Strength and resiliency are the two essentials in steel wheels, particularly those subjected to severe shocks and strains.

The present invention is an improvement upon the wheel embraced in my Patent No. 1,120,256, of Dec. 8th, 1914. It obviates all of the objections of the disk type of wheels, in which a solid disk instead of spokes, is used to connect the rim and hub. The disk type is weak and breaks easily at vital points. In this disk type all the strains and shocks are immediately transmitted to the disk and go thence to the hub, whereas in my construction the shock passes principally through the rim and is distributed to the various spokes, and in this way it is dissipated before it reaches the central portion of the wheel. Another object is the elimination of sharp angles which are weak points, and the introduction of easy curves instead, whereby the shocks will pass on through the metal without breaking it.

In the accompanying drawings, forming a part of this specification, Figure 1 is a side elevation of a metal wheel embodying my invention; Fig. 2, a diametrical sectional view taken on the line 2, 2, 2 of Fig. 1; and Fig. 3 is a section taken on the line 3, 3 of Fig. 1.

As stated in the first object recited above, this wheel structure is hollow throughout— hub spokes and rim affording a maximum of strength with sufficient resiliency. Describing the wheel from the center outward, at 1 is shown the hub, which comprises a hollow body made up, essentially, of the members 2, 3 and 4, with suitable interior flanges for convenience in mounting the wheel on its axle. This whole body is cored out and made hollow, and each member joins its fellow members by means of curved walls, all the curves being easy or gradual, as distinguished from angles and sharp turns.

Proceeding radially, the next feature is that of the spokes. They are composed of an annular plate 5, united with the hub structure, as shown more particularly in Fig. 2, and of spokes proper, indicated at 6. The plate occupies a position between the hub and spokes proper, and all the places of union of these components are formed on easy and gradual curves, all angles and sharp turns being avoided so that shocks and strains find no acute turns or lines of travel, but pass from one part of the structure to other parts along courses which avoid breaking effects and tendencies.

This plate 5 joins the hub along and through gradually curved portions $5^a$ and $5^b$; gradually curves off at $5^c$, to join the spokes proper, and is reinforced or braced by ribs. The plate 5 is also provided with raised portions 8 to further reinforce it. These raised portions preferably are made with three walls, 81, 82, 83, and are placed one under each spoke proper, so as to give the appearance of a continuous spoke from the rim to the hub. But it will be understood that these raised portions can be located at other points and that their construction is subject to modifications. And it will be noted also that this plate, aside from its ribs, is composed of one wall which goes to aid in giving resiliency.

The spokes proper, shown at 6, are hollow bodies having four walls, $6^a$, $6^b$, $6^c$ and $6^d$. All of these walls form easy or gradual curves. The walls $6^a$ join with the plate 5, at the curved part $5^c$, and with the rim 9. The walls $6^b$ join with the plate 5 through walls $8^a$, $8^b$ and $8^c$, and with the rim 9. The walls $6^c$ and $6^d$, join with the rim and with the wall $8^a$, and are so formed as to leave large open spaces, as shown at 10, in Fig. 1. The effect of these spaces is to lighten the wheel, and at the same time to form arches at 11, to aid in supporting the rim at points between the spokes. The rim is composed of two separate portions, 13 and 14, having an intervening space 15 between them. In order to secure these two portions together, I employ tie bars 16 below the outer periphery of the rim.

As these wheels will usually be used as traction wheels, to which power will be applied, they are provided with an annular flange 12, for mounting the gear wheel used in applying the power.

To the rim 9 will be attached any suitable form of tread, usually an elastic or semi-elastic type. This rim in its relation to the spokes proper also forms a hollow structure, it will be noted from Fig. 2.

It will now readily be observed how my improved wheel embodies the features of a hollow structure in which all of the vital parts are formed with, and joined together by gradually curved walls. This hollow feature and these peculiar curved features, give strength and resiliency and lightness to the wheel.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a metal wheel, a hub forming a hollow body, and a web composed of a plate having a series of open reinforced raised portions united to the hub and hollow spokes extending outwardly from said raised portions and terminating in the rim of said wheel.

2. In a metal wheel, a hub forming a hollow body and a web integral with the hub and having a series of open raised portions and hollow spokes extending outwardly from said raised portions and terminating integrally in the rim of said wheel.

3. A metal wheel consisting of a plurality of walls to constitute a hollow structure and comprising a plate having a series of open raised portions, and a corresponding series of hollow spokes extending outwardly from said raised portions.

4. In a metal wheel, a series of hollow spokes composed of four walls, and a rim united to all of said walls, two opposite walls of each spoke forming arches to support portions of said rim, and one wall of each spoke extending inwardly in a raised rib portion and terminating in the hub of the wheel.

5. In a metal wheel, an integral structure comprising a hollow hub body, a plate secured to said hub body by means of gradually curved walls and sets of ribs, spokes proper having four curved walls to form a hollow structure, some of said walls being connected directly with said plate through gradually curved intermediate wall portions, and other of said walls being indirectly connected to said plate through either intermediate wall portions, and a rim connected to said four spoke-walls and arched by two of them.

6. In a metal wheel, a hub, a plurality of hollow spokes and a curved plate uniting the hub and spokes, said plate being provided with a corresponding plurality of reinforced raised portions in radial alinement with said spokes.

7. In a metal wheel, an integral hub, hollow spokes and a plate, said plate having a series of open reinforced raised portions extending outwardly in radial alinement with said spokes.

8. In a metal wheel, an integral structure comprising a hollow hub body, a plate secured to said hub body by means of gradually curved walls, spokes proper having four curved walls to form a hollow structure, some of said walls being connected directly with said plate through gradually curved intermediate wall portions, and other of said walls being connected indirectly to said plate through other intermediate wall portions, and a rim connected to said four spoke-walls and arched by two of them.

9. In a metal wheel, a hub, spokes, a rim composed of two separated portions, and means for securing said portions together, one of said portions comprising walls of a hollow spoke terminating in a plate uniting said portions with the hub of the wheel, the other of said portions terminating in an inner rim supported by said plate.

10. In a metal wheel, a hub, spokes, a rim composed of two separated portions, and means placed below the outer periphery of the rim to secure said portions together and consisting of a plate uniting one of said portions with the hub of the wheel and an inner rim uniting the other portion with said plate.

11. In a metal wheel, a hub forming a hollow body, a web united to the hub and of hollow spokes united to said plate, a rim composed of two separated portions, and means below the outer periphery of said rim for securing said portions together, and consisting of a plate uniting one of said portions with the hub of the wheel and an inner rim uniting the other portion with said plate.

In testimony whereof, I affix my signature.

GEORGE WALTHER.